United States Patent
Katagiri et al.

(10) Patent No.: US 11,084,173 B2
(45) Date of Patent: Aug. 10, 2021

(54) ROBOT SYSTEM AND CONTROL METHOD FOR ROBOT SYSTEM

(71) Applicant: FANUC CORPORATION, Yamanashi (JP)

(72) Inventors: Taiki Katagiri, Yamanashi (JP); Kentaro Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 131 days.

(21) Appl. No.: 16/413,060

(22) Filed: May 15, 2019

(65) Prior Publication Data

US 2019/0375602 A1    Dec. 12, 2019

(30) Foreign Application Priority Data

Jun. 8, 2018   (JP) .............................. JP2018-110456

(51) Int. Cl.
*B25J 9/16* (2006.01)
*B65G 47/90* (2006.01)
(Continued)

(52) U.S. Cl.
CPC ........... *B25J 9/1697* (2013.01); *B25J 9/0093* (2013.01); *B65G 47/905* (2013.01);
(Continued)

(58) Field of Classification Search
CPC .................................................. B65G 47/905
See application file for complete search history.

(56) References Cited

U.S. PATENT DOCUMENTS 10,793,378 B2 * 10/2020 Tanaka ..................... B25J 9/026
2011/0074171 A1    3/2011 Maehara et al.
(Continued)

FOREIGN PATENT DOCUMENTS

GB   2471819 A   1/2011
GB   2492257 A   12/2012
(Continued)

OTHER PUBLICATIONS

"Illustration of three-dimensional measurement with a multi-array sensor" from the Internet site of Honda Electronics Co., Ltd., URL: https://www.honda-el.co.jp/hb/3_23.html.

*Primary Examiner* — Thomas Randazzo
(74) *Attorney, Agent, or Firm* — Karceski IP Law, PLLC

(57) ABSTRACT

A robot system includes a sensor, a robot equipped with a gripping device capable of gripping a detected article, and a controller. The controller includes a gripping area setting unit that, for each article, sets a gripping area in which the gripping device is to be positioned when it grips the article, a determination unit that determines presence or absence of interference between the gripping area and other articles, a storage unit that stores a result of determination on the presence or absence of interference determined by the determination unit in association with each detected article, a robot control unit that causes the gripping device to pick up an article for which no other article interferes with the gripping area thereof, and an updating unit that updates the result of determination stored in the storage unit every time an article is picked up by the gripping device.

6 Claims, 8 Drawing Sheets

(51) Int. Cl.
  *G06T 7/70* (2017.01)
  *G06T 7/60* (2017.01)
  *G06F 3/0484* (2013.01)
  *B25J 9/00* (2006.01)

(52) U.S. Cl.
  CPC .............. *G06F 3/0484* (2013.01); *G06T 7/60* (2013.01); *G06T 7/70* (2017.01); *G05B 2219/45083* (2013.01)

(56) References Cited

U.S. PATENT DOCUMENTS

| | | | |
|---|---|---|---|
| 2011/0082586 A1 | 4/2011 | Nishihara | |
| 2012/0229620 A1* | 9/2012 | Ikeda | B25J 9/1692 348/94 |
| 2014/0277694 A1* | 9/2014 | Ichimaru | B25J 9/1612 700/218 |
| 2014/0298231 A1* | 10/2014 | Saito | G06F 3/0484 715/771 |
| 2015/0003678 A1* | 1/2015 | Watanabe | B25J 9/1697 382/103 |
| 2015/0151430 A1* | 6/2015 | Koyanagi | B25J 9/0084 700/230 |
| 2015/0262414 A1* | 9/2015 | Minato | G06K 9/6211 345/420 |
| 2017/0001308 A1* | 1/2017 | Bataller | G05B 19/0423 |
| 2017/0017862 A1* | 1/2017 | Konishi | G06K 9/6202 |
| 2018/0056523 A1* | 3/2018 | Aiso | B25J 9/1697 |
| 2018/0117766 A1* | 5/2018 | Atohira | B25J 9/1697 |
| 2018/0194573 A1* | 7/2018 | Iwai | B25J 9/1697 |
| 2019/0130180 A1* | 5/2019 | Shiraishi | G06T 7/20 |

FOREIGN PATENT DOCUMENTS

| | | |
|---|---|---|
| JP | 2009297881 A | 12/2009 |
| JP | 2011073066 A | 4/2011 |
| JP | 2016185573 A | 10/2016 |

\* cited by examiner

FIG. 3A

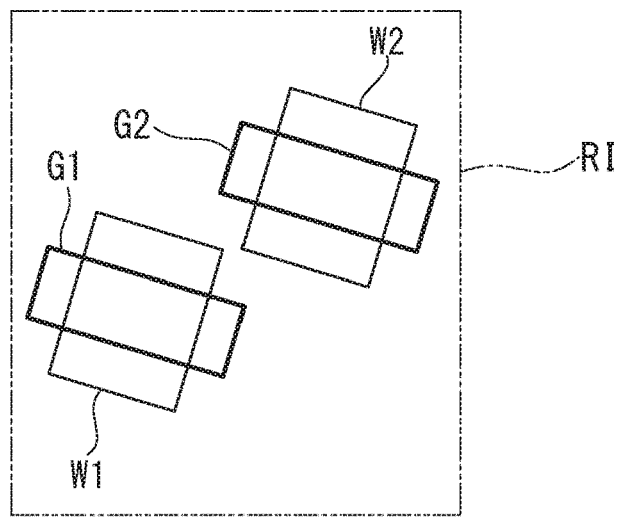

FIG. 3B

```
                ARTICLE STATUS DB
                        ⋮

ARTICLE   W1
    DETECTION POSITION : X1, Y1
    ANGLE : R1
    STATUS :  PICKABLE
    OTHER ARTICLES LYING IN ITS GRIPPING AREA : NONE
    OTHER ARTICLES IN WHOSE GRIPPING AREA THE
    ARTICLE ITSELF LIES :  NONE

ARTICLE   W2
    DETECTION POSITION : X2, Y2
    ANGLE : R2
    STATUS :  PICKABLE
    OTHER ARTICLES LYING IN ITS GRIPPING AREA : NONE
    OTHER ARTICLES IN WHOSE GRIPPING AREA THE
    ARTICLE ITSELF LIES :  NONE

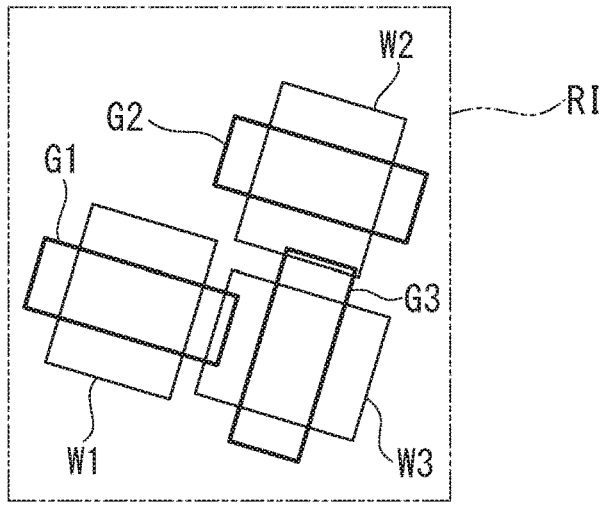

FIG. 4B

```
                    ARTICLE STATUS DB
                           :
                           :
            ┌─────────────────────────────────────────────┐
            │                ARTICLE   W1                 │
            │ DETECTION POSITION : X1,Y1                  │
            │ ANGLE : R1                                  │
            │ STATUS :  UNPICKABLE                        │
            │ OTHER ARTICLES LYING IN ITS GRIPPING AREA : W3 │
            │ OTHER ARTICLES IN WHOSE GRIPPING AREA THE   │
            │ ARTICLE ITSELF LIES :  NONE                 │
            └─────────────────────────────────────────────┘
            ┌─────────────────────────────────────────────┐
            │                ARTICLE   W2                 │
            │ DETECTION POSITION : X2,Y2                  │
            │ ANGLE : R2                                  │
            │ STATUS :  PICKABLE                          │
            │ OTHER ARTICLES LYING IN ITS GRIPPING AREA : NONE │
            │ OTHER ARTICLES IN WHOSE GRIPPING AREA THE   │
            │ ARTICLE ITSELF LIES : W3                    │
            └─────────────────────────────────────────────┘
            ┌─────────────────────────────────────────────┐
            │                ARTICLE   W3                 │
            │ DETECTION POSITION : X3,Y3                  │
            │ ANGLE : R3                                  │
            │ STATUS :  UNPICKABLE                        │
            │ OTHER ARTICLES LYING IN ITS GRIPPING AREA : W2 │
            │ OTHER ARTICLES IN WHOSE GRIPPING AREA THE   │
            │ ARTICLE ITSELF LIES : W1                    │
            └─────────────────────────────────────────────┘
                           :
                           :
```

FIG. 5A

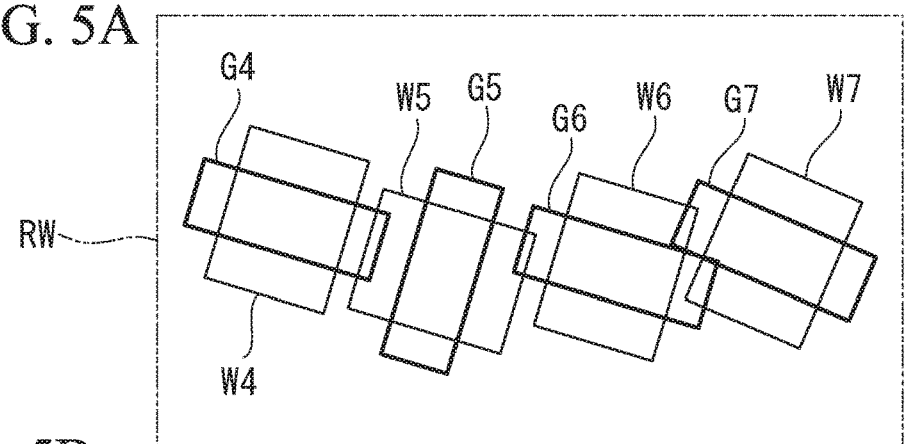

FIG. 5B

```
              ARTICLE STATUS DB
                      :

ARTICLE   W4
DETECTION POSITION : X4, Y4
ANGLE : R4
STATUS :  UNPICKABLE
OTHER ARTICLES LYING IN ITS GRIPPING AREA : W5
OTHER ARTICLES IN WHOSE GRIPPING AREA THE
ARTICLE ITSELF LIES :  NONE

ARTICLE   W5
DETECTION POSITION : X5, Y5
ANGLE : R5
STATUS :  PICKABLE
OTHER ARTICLES LYING IN ITS GRIPPING AREA : NONE
OTHER ARTICLES IN WHOSE GRIPPING AREA THE
ARTICLE ITSELF LIES : W4, W6

ARTICLE   W6
DETECTION POSITION : X6, Y6
ANGLE : R6
STATUS :  UNPICKABLE
OTHER ARTICLES LYING IN ITS GRIPPING AREA : W5, W7
OTHER ARTICLES IN WHOSE GRIPPING AREA THE
ARTICLE ITSELF LIES : W7

ARTICLE   W7
DETECTION POSITION : X7, Y7
ANGLE : R7
STATUS :  UNPICKABLE
OTHER ARTICLES LYING IN ITS GRIPPING AREA : W6
OTHER ARTICLES IN WHOSE GRIPPING AREA
THE ARTICLE ITSELF LIES : W6

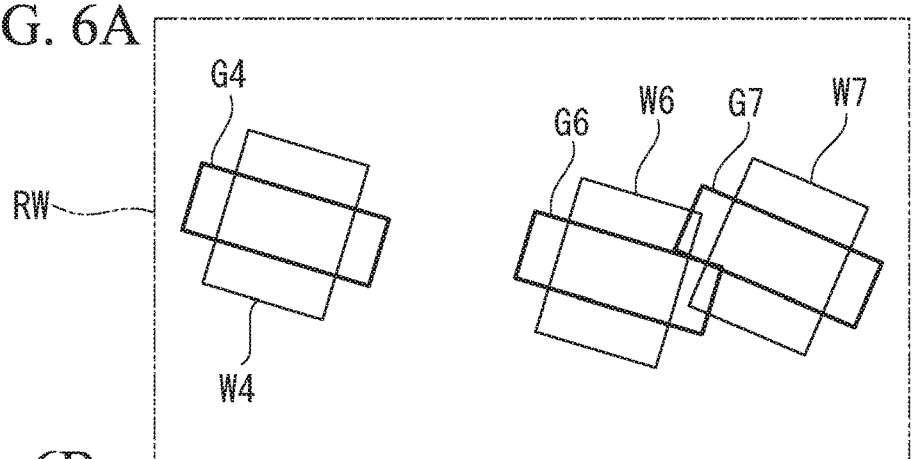

FIG. 6B

```
                    ARTICLE STATUS DB
                            :
                            :
    ┌─────────────────────────────────────────────────────┐
    │                    ARTICLE  W4                      │
    │ DETECTION POSITION : X4,Y4                          │
    │ ANGLE : R4                                          │
    │ STATUS : PICKABLE                                   │
    │ OTHER ARTICLES LYING IN ITS GRIPPING AREA : NONE    │
    │ OTHER ARTICLES IN WHOSE GRIPPING AREA THE           │
    │ ARTICLE ITSELF LIES :  NONE                         │
    └─────────────────────────────────────────────────────┘
    ┌─────────────────────────────────────────────────────┐
    │                    ARTICLE  W5                      │
    │ DETECTION POSITION : X5,Y5                          │
    │ ANGLE : R5                                          │
    │ STATUS : PICKUP COMPLETE                            │
    │ OTHER ARTICLES LYING IN ITS GRIPPING AREA : NONE    │
    │ OTHER ARTICLES IN WHOSE GRIPPING AREA THE           │
    │ ARTICLE ITSELF LIES : W4,W6                         │
    └─────────────────────────────────────────────────────┘
    ┌─────────────────────────────────────────────────────┐
    │                    ARTICLE  W6                      │
    │ DETECTION POSITION : X6,Y6                          │
    │ ANGLE : R6                                          │
    │ STATUS : UNPICKABLE                                 │
    │ OTHER ARTICLES LYING IN ITS GRIPPING AREA : W7      │
    │ OTHER ARTICLES IN WHOSE GRIPPING AREA THE           │
    │ ARTICLE ITSELF LIES : W7                            │
    └─────────────────────────────────────────────────────┘
    ┌─────────────────────────────────────────────────────┐
    │                    ARTICLE  W7                      │
    │ DETECTION POSITION : X7,Y7                          │
    │ ANGLE : R7                                          │
    │ STATUS : UNPICKABLE                                 │
    │ OTHER ARTICLES LYING IN ITS GRIPPING AREA : W6      │
    │ OTHER ARTICLES IN WHOSE GRIPPING AREA THE           │
    │ ARTICLE ITSELF LIES : W6                            │
    └─────────────────────────────────────────────────────┘
                            :
                            :
```

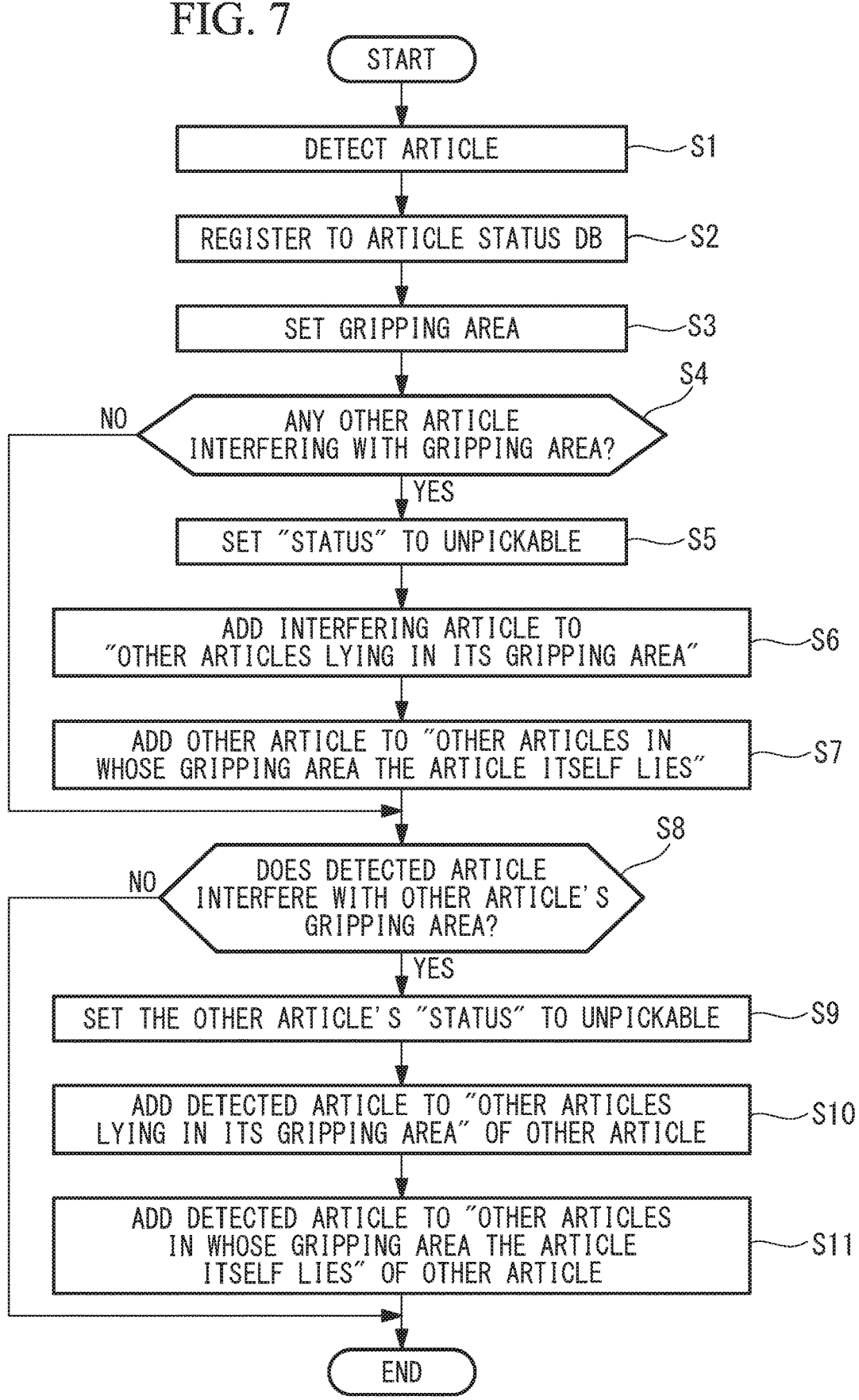

ROBOT SYSTEM AND CONTROL METHOD FOR ROBOT SYSTEM

CROSS-REFERENCE TO RELATED APPLICATIONS

This application is based on and claims priority to Japanese Patent Application No. 2018-110456, the entire content of which is incorporated herein by reference.

FIELD OF THE INVENTION

The present invention relates to a robot system and a control method for the robot system.

BACKGROUND OF THE INVENTION

In a known robot system, a number of incoming articles randomly placed on a conveyer are detected with a visual sensor and a robot picks up an article of interest with a gripping device based on the shapes and attitudes of the detected articles (see Japanese Unexamined Patent Application, Publication No. 2016-185573, for instance). In the robot system described in Japanese Unexamined Patent Application, Publication No. 2016-185573, when the distance between a target article to be picked up and another article is short, a path for the robot at the time of picking up the target article is corrected for preventing interference between the gripping device and the other article.

SUMMARY OF THE INVENTION

An aspect of the present invention provides a robot system including a sensor for detecting a shape of an article being conveyed, a robot equipped with a gripping device capable of gripping a detected article, and a controller for controlling the robot. The controller includes; a gripping area setting unit that, for each one of detected articles, sets a gripping area in which the gripping device is to be positioned when the gripping device grips the article; a determination unit that determines presence or absence of interference between the gripping area that has been set and other articles; a storage unit that stores a result of determination on the presence or absence of interference determined by the determination unit in association with each detected article; a robot control unit that controls the robot to cause the gripping device to pick up an article for which no other article interferes with the gripping area thereof; and an updating unit that updates the result of determination stored in the storage unit every time an article is picked up by the gripping device.

Another aspect of the present invention provides a control method for a robot system, the method including: a detection step of detecting a shape of an article being conveyed; a gripping area setting step of setting, for each one of detected articles, a gripping area in which a gripping device is to be positioned when the gripping device is caused to grip the article; a determination step of determining presence or absence of interference between the gripping area that has been set and other articles; a storage step of storing a result of determination on the presence or absence of interference in a storage unit in association with each detected article; a control step of controlling a robot to cause the gripping device to pick up an article for which no other article interferes with the gripping area thereof; and an updating step of updating the result of determination stored in the storage unit every time an article is picked up by the gripping device.

BRIEF DESCRIPTION OF THE DRAWINGS

FIG. 3A is a diagram for describing gripping areas and interference information that are set for articles and is a top view of an imaging range of a sensor.
FIG. 3B is a diagram for describing gripping areas and interference information that are set for articles and shows interference information for articles stored in an article status DB.
FIG. 4A is a diagram for describing gripping areas and interference information after a new article has been detected from the situation shown in FIGS. 3A and 3B and is a top view of the imaging range of the sensor.
FIG. 4B is a diagram for describing gripping areas and interference information after a new article has been detected from the situation shown in FIGS. 3A and 3B and shows interference information for articles stored in the article status DB.
FIG. 5A is a diagram for describing gripping areas and interference information that are set for articles and is a top view of a working range of a hand.
FIG. 5B is a diagram for describing gripping areas and interference information that are set for articles and shows interference information for articles stored in the article status DB.
FIG. 6A is a diagram for describing the gripping areas and interference information after an article has been picked up from the situation shown in FIGS. 5A and 5B and is a top view of the working range of the hand.
FIG. 6B is a diagram for describing the gripping areas and interference information after an article has been picked up from the situation shown in FIGS. 5A and 5B and shows interference information for articles stored in the article status DB.
FIG. 7 is a flowchart of a process that is performed by the robot system at the time of article detection.

DESCRIPTION OF EMBODIMENT(S) OF THE INVENTION

A robot system 100 according to an embodiment of the present invention is described below with reference to the drawings.

Figure 1:
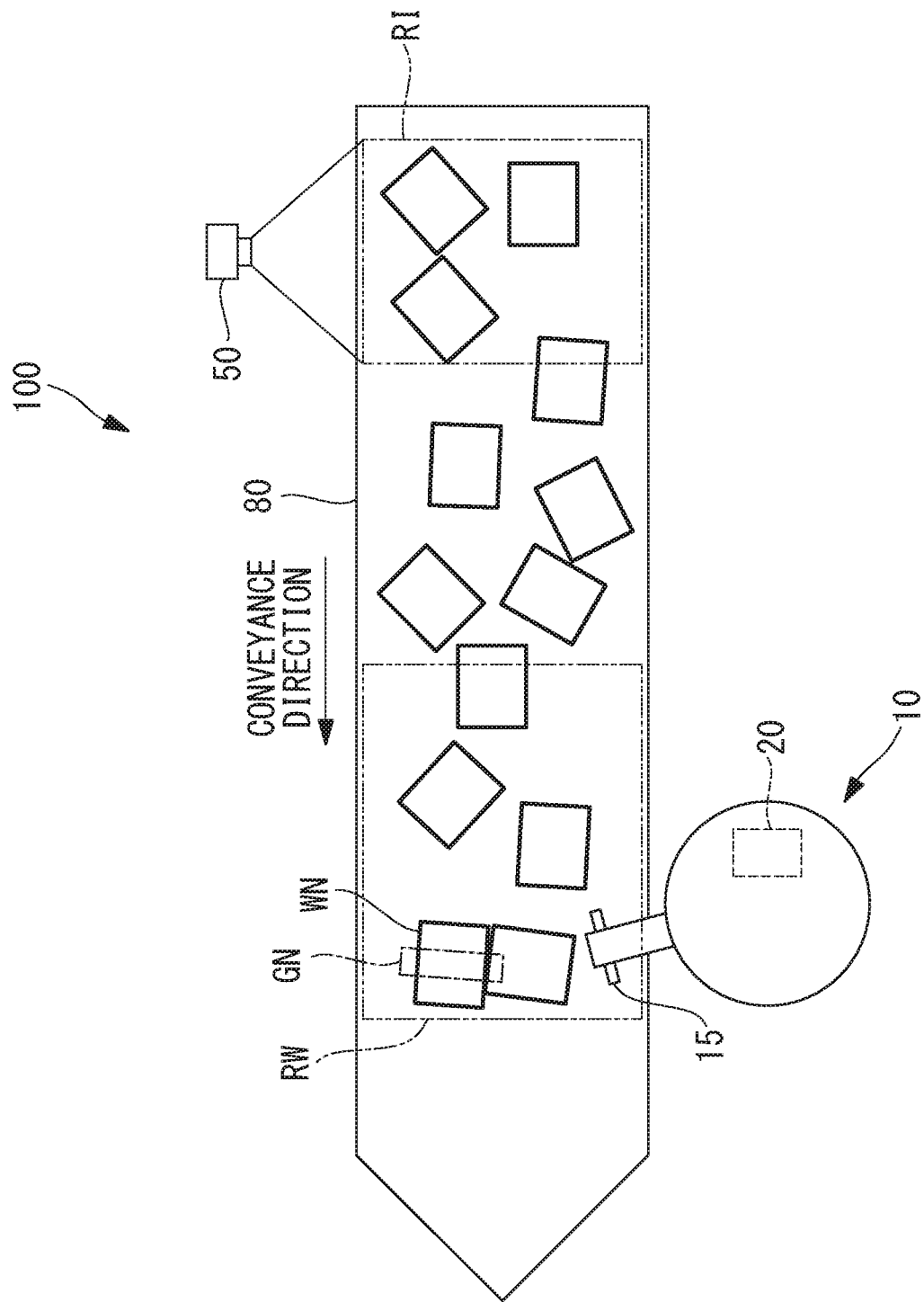
FIG. 1 is a schematic top view of a robot system according to the present invention.

As shown in FIG. 1, the robot system 100 according to this embodiment includes a conveyer 80 which conveys multiple articles WN (N=1, 2, . . . ), a sensor 50 for detecting the articles WN being conveyed on the conveyer 80, a robot 10 with a hand (a gripping device) 15 for gripping the articles WN, and a controller 20 for controlling the robot 10.

The sensor 50 is a three-dimensional camera capable of acquiring the three-dimensional shapes of articles WN and captures an imaging range R1 on the conveyer 80. The robot 10 is a vertically articulated robot with six joints, for example, and operates via control of the rotation angle of each joint by the controller 20. The hand 15, attached at a tip of the robot 10, performs gripping actions on the articles WN being conveyed on the conveyer 80. The area in which the hand 15 is operable on the conveyer 80 is a working range RW, located downstream of the imaging range RI of the sensor 50 as shown in FIG. 1.

The conveyer 80 conveys the articles WN at a constant speed in the conveyance direction indicated by the arrow in FIG. 1. The conveyer 80 is equipped with an encoder (not shown) for detecting the conveyance speed of the conveyer 80. With transmission of a detected value of the encoder to the controller 20, the controller 20 calculates the conveyance speed of the conveyer 80.

The controller 20 controls the operation of the robot 10 in accordance with a predetermined program so as to perform various kinds of actions, such as picking up, on the articles WN being conveyed on the conveyer 80. Although the controller 20 in this embodiment is contained in the robot 10, controllers in other embodiments may be separate components from the robot 10.

Figure 2:
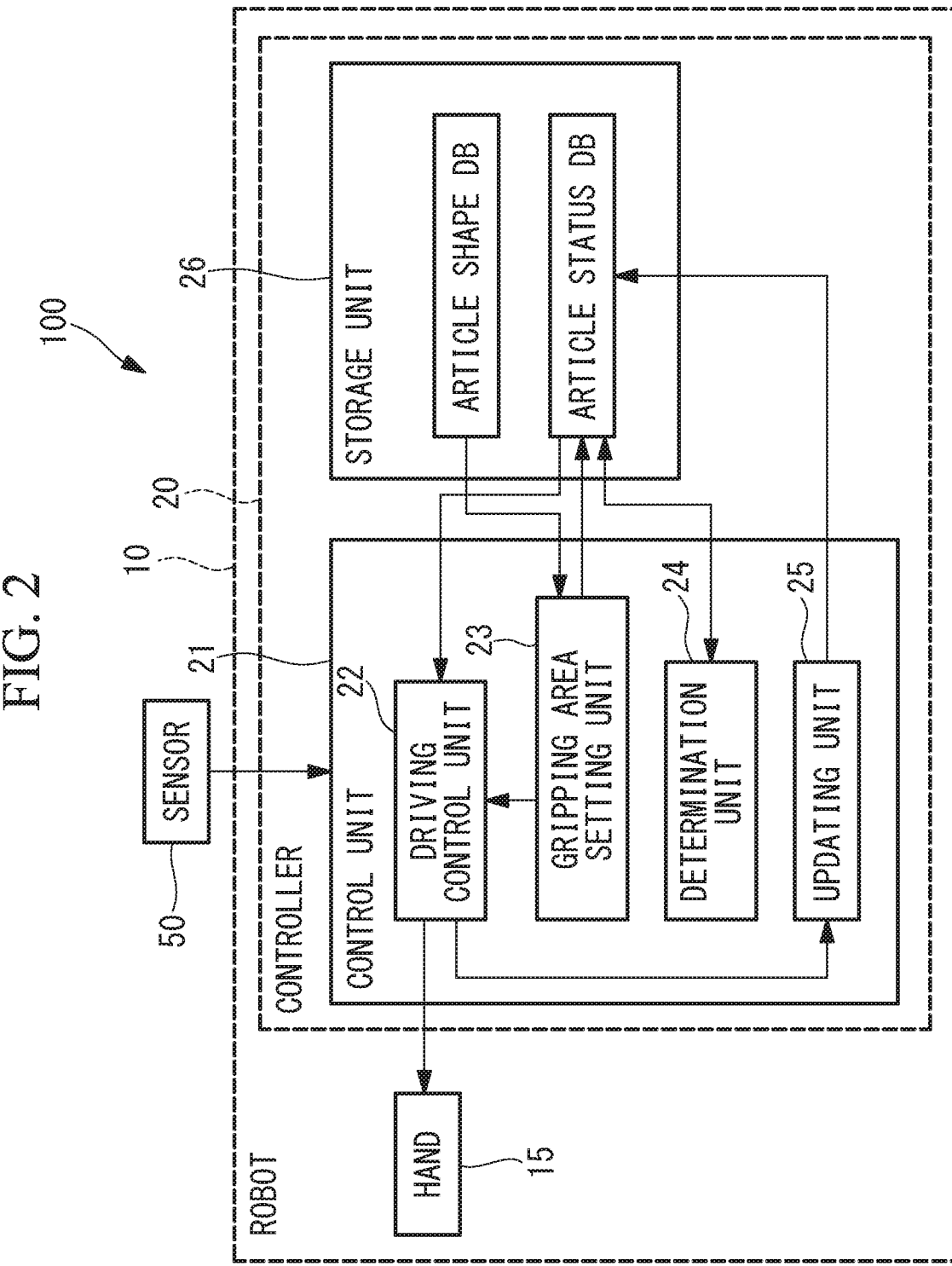
FIG. 2 is a block diagram of the robot system.

FIG. 2 is a block diagram of the robot system 100. As shown in FIG. 2, the controller 20 includes a control unit 21 for controlling the operation of the robot 10 in accordance with the attitudes and positions of articles WN detected by the sensor 50, and a storage unit 26 storing the three-dimensional shapes of the articles WN and the like.

The storage unit 26 is composed of a storage medium such as RAM (Random Access Memory) or an HDD (Hard Disk Drive). The storage unit 26 has an article shape DB storing the three-dimensional shapes of multiple articles WN to be operated on by the robot 10, and an article status DB which stores interference information on the presence or absence of interference between each article detected by the sensor 50 and other articles.

For each of the three-dimensional shapes of multiple articles WN, the article shape DB stores a gripping area GN associated with the three-dimensional shape, such as shown in FIG. 1. The gripping area GN is stored as an area in which the hand 15 is to be positioned when the detected article WN is gripped by the hand 15.

Interference information associated with each article stored in the article status DB is described with reference to FIGS. 3A and 3B. FIG. 3A shows a top view of the imaging range RI in a situation where two articles W1, W2 being conveyed on the conveyer 80 have been detected. When the articles W1, W2 are detected by the sensor 50, a gripping area setting unit 23, discussed later, identifies which ones of the stored articles the detected articles W1, W2 are by pattern matching using the three-dimensional shapes of multiple articles stored in the article shape DB. The gripping area setting unit 23 then sets gripping areas G1, G2 for the articles W1, W2, respectively.

As interference information for the articles W1, W2, the article status DB stores the presence or absence of interference per article name (identification information) of each of the articles W1, W2 shown in FIG. 3B in regard to interference with other articles in their gripping areas G1, G2. The interference information includes a detection position representing the center of gravity of the detected article W1, W2, an angle indicative of an inclination from a reference attitude for representing the attitude of the article W1, W2, a status representing whether the article can be picked up by the hand 15 or not, information on other articles lying in its gripping area (first interfering article information), and information on other articles in whose gripping area the article itself lies (second interfering article information).

The detection positions and angles of the articles W1, W2 are identified by use of the reference attitude associated with the three-dimensional shapes of the respective articles stored in the article shape DB and an image captured and detected by the sensor 50.

Taking the interference information for the article W1 as an example, no other article interferes with the gripping area G1 of the article W1, as shown in FIG. 3A. Thus, as shown in FIG. 3B, a determination unit 24, discussed later, first determines the "status" of the article W1 to be "pickable" and sets the status as such. The determination unit 24 also sets "Other articles lying in its gripping area" for the article W1 to "None". As the article W1 does not interfere with the gripping areas of any other articles, the determination unit 24 sets the "Other articles in whose gripping area the article itself lies" of the article W1 to "None".

The control unit 21 shown in FIG. 2 is composed of a CPU, ROM, and RAM, which are not shown. The control unit 21 reads programs stored in the ROM or the storage unit 26, makes temporary reading and storage to/from the RAM, and executes functions corresponding to various programs by means of the CPU.

The control unit 21 includes a driving control unit (robot control unit) 22 for controlling the operation of the robot 10, the gripping area setting unit 23 for setting the gripping areas G1, G2 for the articles W1, W2 detected by the sensor 50 (FIG. 3A), the determination unit 24 for determining the presence or absence of interference of other articles W1, W2 in the gripping areas G1, G2 that have been set, and an updating unit 25 for updating interference information stored in the article status DB every time an article being conveyed by the conveyer 80 is picked up by the hand 15.

FIGS. 4A and 4B show a situation where a new article W3 has been further detected by the sensor 50 from the situation shown in FIGS. 3A and 3B. When the article W3 is detected by the sensor 50, the determination unit 24 adds the interference information for the article W3 to the article status DB as shown in FIG. 4B. As a result of the new article W3 being detected, the article W3 interferes with the gripping area G1 of the article W1, as shown in FIG. 4A. Accordingly, the determination unit 24 adds "W3" to the "Other articles lying in its gripping area" of the article W1 as shown in FIG. 4B. This indicates that the article W1 would interfere with the article W3 when the hand 15 picks up the article W1. Accordingly, the determination unit 24 changes the "status" of the article W1 shown in FIG. 4B to "unpickable".

FIGS. 5 and 6 are diagrams for describing the positional relationship among articles before and after an article is picked up by the hand 15 and the interference information for each article contained in the article status DB. FIG. 5A shows a top view of the working range RW of the hand 15 before the article W5 is picked up by the hand 15. Since the positional relationship between the working range RW and the imaging range RI is predefined, the driving control unit 22 can calculate the positions and attitudes of articles in the working range RW from the detection positions and angles of the articles in their interference information stored in the article status DB. Thus, the driving control unit 22 is able to identify articles contained in the working range RW using a detection result from the sensor 50.

As shown in FIG. 5A, for the articles W4 to W7 detected by the sensor 50, gripping areas G4 to G7 are respectively set by the gripping area setting unit 23. As shown in FIG. 5B, interference information for each of the articles W4 to W7 is stored in the article status DB.

As shown in FIG. 5A, other article(s) interfere with the respective gripping areas G4, G6, G7 of the articles W4, W6, W7, while no other article interferes with the gripping area G5 of the article W5. Accordingly, only the "status" of the article W5 is set to "pickable" as shown in the article status DB of FIG. 5B. In this case, the driving control unit 22 executes picking up of the article W5, whose "status" is "pickable", among the articles W4 to W7 stored in the article status DB. When there are more than one article whose "status" is "pickable", picking up will be executed starting with the article on the downstream side.

As shown in FIG. 5A, the article W6 and the article W7 interfere with each other's gripping area G6, G7. In this embodiment, the updating unit 25 sets the "status" of such articles W6, W7 to "unpickable" and does not update the interference information of the articles W6, W7 irrespective of picking up of other articles.

FIG. 6A shows a top view of the working range RW after the article W5 has been picked up from the situation shown in FIG. 5A. After the article W5 is picked up, the updating unit 25 updates the "status" of the article W5 in the article status DB to "pickup complete" as shown in FIG. 6B. Upon updating of the "status" of the article W5, the determination unit 24 again determines the presence or absence of interference of other articles in the gripping area set for each article based on the article status DB after the update.

The determination unit 24 again determines the presence or absence of interference of the articles W4 and W6, which have been set in the "Other articles in whose gripping area the article itself lies" of the picked-up article W5. For example, in the interference information of the article W4, the article W5 was set as "Other articles lying in its gripping area" as shown in FIG. 5B before the article W5 was picked up. When the article W5 is picked up after an update, the determination unit 24 changes the "Other articles lying in its gripping area" for the article W4 to "None" as shown in FIG. 6B. In response, the "status" of the article W4 changes to "pickable".

The determination unit 24 also changes the "Other articles lying in its gripping area" for the article W6 from "W5 and W7 (FIG. 5B)" to "W7 (FIG. 6B)". Meanwhile, the interference information of the article W7, for which the article W5 was not set in "Other articles in whose gripping area the article itself lies", has not changed. In the situation shown in FIGS. 6A and 6B, the article W4 with the "status" of "pickable" among the articles W4, W6 and W7 will be picked up by the hand 15 next.

A process that is performed by the robot system 100 according to this embodiment at the time of article detection is described by taking the detection of the article W3 shown in FIGS. 4A and 4B as an example with respect to the flowchart shown in FIG. 7. The sensor 50 first performs a detection step of detecting the article W3 being conveyed on the conveyer 80 (step S1). The detection positions X3, Y3 and angle R3 of the detected article W3 are identified by the gripping area setting unit 23 and registered in the article status DB (step S2).

The gripping area setting unit 23 performs a gripping area setting step of setting a gripping area G3 for the detected article W3 (step S3). The determination unit 24 performs a determination step of determining whether any other article interferes with the gripping area G3 that has been set (step S4). If it is determined that no other article interferes with the gripping area G3 (step S4: NO), the processing at step S8 discussed later is executed.

In the processing at step S4, if it determines that other article W2 interferes with the gripping area G3 (step S4: YES), the determination unit 24 sets the "status" of the article W3 in the article status DB to "unpickable" (step S5).

The determination unit 24 adds the article W2, which interferes with the gripping area G3, to the "Other articles lying in its gripping area" of the article W3 (step S6). Then, as the article W3 lies in the gripping area G1 of other article W1, the determination unit 24 adds the article W1 to the "Other articles in whose gripping area the article itself lies" of the article W3 (step S7).

The determination unit 24 determines whether the article W3 that was detected (hereinafter also called "detected article W3") interferes with the gripping areas of other articles or not (step S8). If it is determined that the detected article W3 does not interfere with the gripping areas of other articles (step S8: NO), the process performed at the time of article detection by the robot system 100 ends.

In the processing at step S8, as the detected article W3 interferes with the gripping area G1 of the article W1 (step S8: YES), the determination unit 24 sets the "status" of the article W1 as other article to "unpickable" (step S9). The determination unit 24 adds the detected article W3 to the "Other articles lying in its gripping area" of the article W1 (step S10).

The determination unit 24 then adds the detected article W3 to the "Other articles in whose gripping area the article itself lies" of the article W2, i.e., other article (step S11). Steps S5 through S7 and steps S9 through S11 correspond to a storage step.

After the processing at step S11 is executed, the process performed by the robot system 100 at the time of article detection shown in FIG. 7 ends.

Figure 8:
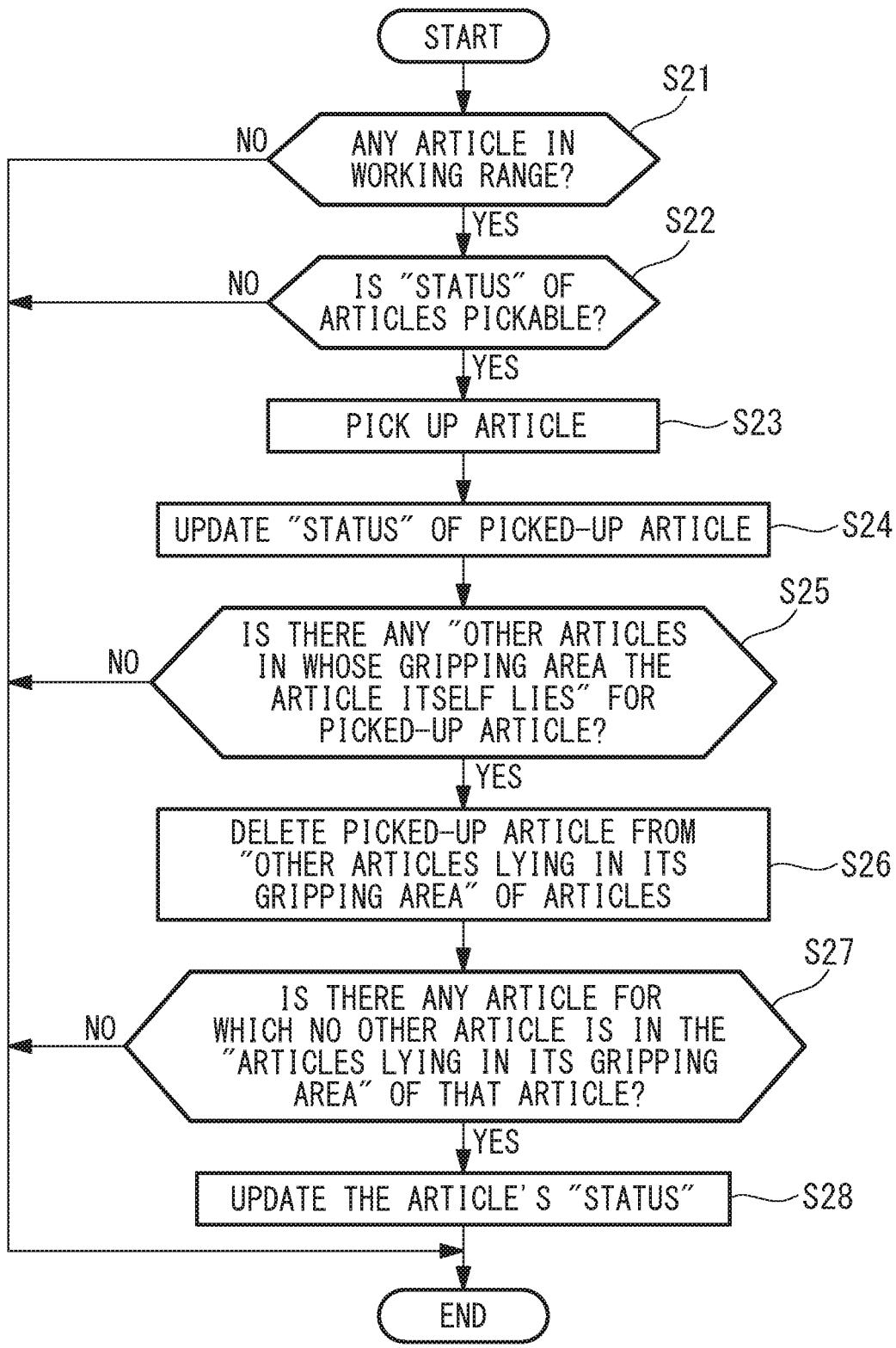
FIG. 8 is a flowchart of a process that is performed by the robot system at the time of article pickup.

Next, a process that is performed by the robot system 100 according to this embodiment at the time of article pickup is described by illustrating an example where the article W5 is picked up in the situation shown in FIGS. 5A and 5B which results in the situation shown in FIGS. 6A and 6B, with respect to the flowchart shown in FIG. 8.

First, the driving control unit 22 determines whether any article is present in the working range RW of the hand 15 (step S21). If it determines that no article is present in the working range RW (step S21: NO), the process performed at the time of article pickup ends.

If the driving control unit 22 determines that articles are present in the working range RW in the processing at step S21 (step S21: YES), it then determines whether the "status" of each of the articles W4 to W7 present in the working range RW is "pickable" or not (step S22). If the "status" of all the articles present in the working range RW is "unpickable" (step S22: NO), the process performed at the time of article pickup ends.

In the processing at step S22, if the article W5, whose "status" is "pickable", is present in the working range RW as shown in FIG. 5B (step S22 in FIG. 8: YES), the driving control unit 22 performs a control step of controlling the hand 15 to pick up the article W5 (step S23).

After the article W5 is picked up, the updating unit 25 updates the "status" of the picked-up article W5 stored in the article status DB to "pickup complete" as shown in FIG. 6B (step S24 in FIG. 8). In other embodiments, the interference information of a picked-up article may be deleted from the article status DB.

Then, the determination unit 24 again determines the presence or absence of interference between the articles based on the article status DB after the picking up of the article W5. The determination unit 24 determines whether any article is set in the "Other articles in whose gripping area the article itself lies" of the article W5 which was picked up (hereinafter also called "picked-up article W5") (step S25). If no article is set (step S25: NO), the process performed at the time of article pickup ends.

In the processing at step S25, as articles W4 and W6 have been set as the "Other articles in whose gripping area the article itself lies" of the picked-up article W5 (step S25:

YES), the updating unit 25 deletes the picked-up article W5 from the "Other articles lying in its gripping area" of each of the articles W4 and W6 shown in FIG. 5B (step S26).

Thereafter, the determination unit 24 again determines the presence or absence of interference for the articles W4 and W6 and then determines whether there is any article for which no other article is set in the "Articles lying in its gripping area" in the article status DB for the articles present in the working range RW (step S27). If it is determined that there is not a single article for which no other article is set in the "Articles lying in its gripping area" (step S27: NO), the process performed at the time of article pickup ends.

At step S27, as no other article is included in the "Articles lying in its gripping area" of the article W4 in the article status DB as shown in FIG. 6B (step S27: YES), the determination unit 24 performs an updating step of updating the "status" of the article W4 to "pickable" (step S28). After this, the process performed at the time of article pickup for the article W5 ends and similar picking up of an article is executed for pickable articles contained in the working range RW.

Effects of the robot system 100 according to this embodiment configured as discussed above are described below.

When an article W5 being conveyed (FIGS. 5A and 5B) is detected by the sensor 50, the presence or absence of interference of other articles in the gripping area G5 set for the article W5 is determined by the determination unit 24 and the result of determination is stored in the article status DB. If no other article interferes with the gripping area G5 of the article W5, the article W5 is picked up with the gripping area G5 being gripped by the hand 15 without the hand 15 and the article W5 interfering with other articles. After the article W5 is picked up, the results of determination for the articles W4, W6, W7 stored in the article status DB are updated by the updating unit 25 and the determination unit 24. As a consequence of the update, even the article W4, which was determined to be unpickable at the time of article detection, turns into an article that can be picked up by the hand 15 owing to the picking up of the article W5.

In the robot system 100 according to the above embodiment, any other article that interferes with the gripping areas G4 to G7 of the articles W4 to W7 is stored being associated with the "Other articles lying in its gripping area" of each of the articles W4 to W7 in the article status DB. This enables the driving control unit 22 to select an article for which no other article interferes with its gripping area as the next article to be picked up by referencing only the "Other articles lying in its gripping area" in the article status DB.

In the robot system 100 according to the above embodiment, when the articles W4 to W7 interfere with the gripping areas of other articles, "Other articles in whose gripping area the article itself lies" are stored in the article status DB as the interference information of the articles W4 to W7. Thus, when the article W5 is picked up by the hand 15, the next article to be picked up can be selected by updating the interference information only of the articles W4, W6, which are set as the "Other articles in whose gripping area the article itself lies" of the article W5.

In the robot system 100 according to the above embodiment, the "status" of the articles W6, W7, which interferes with each other's gripping area G6, G7, is set to "unpickable" irrespective of picking up of other articles and the interference information of the articles W6, W7 is not updated. This reduces the amount of processing for updating the interference information of the articles W6, W7.

The robot system 100 according to the above embodiment is an example and may be modified in various manners. For example, the article status DB only has to store the gripping areas set for individual articles and the presence or absence of interference with other articles interfering with the gripping areas. The article status DB thus may not necessarily include information such as the "status" or "Other articles in whose gripping area the article itself lies" with the articles W1, W2 shown in FIG. 3B. Additionally, in this embodiment, the interference information of the articles W6, W7, which interfere with each other's gripping area G6, G7 shown in FIG. 5B, is not updated. However, in other embodiments, the interference information of all the articles may be updated every time another article is picked up irrespective of the presence or absence of interference.

Although the robot 10 in the above embodiment is a vertically articulated robot, it may be modified in various manners to the extent of being a robot capable of picking up articles WN conveyed on the conveyer 80. Although the conveyer 80 was described as an example of a conveyance device for conveying articles WN, it may be a conveyance device other than the conveyer 80. Further, the conveyer 80 may not be included in the robot system 100. Articles to be conveyed on the conveyer 80 may not be articles of the same kind like the articles W1 to W7 in the above embodiment, but multiple kinds of articles may be conveyed and picked up by the hand 15.

The sensor 50 for detecting the articles WN being conveyed may be a sensor other than a three-dimensional camera, such as a two-dimensional camera, a photoelectric sensor, or a multi-array sensor. When a multi-array sensor is used, distances in the vertical direction could be measured simultaneously by multiple sensors disposed in a matrix on a two-dimensional plane to obtain a three-dimensional image of an object.

As a result, the above-described embodiment leads to the following aspects.

An aspect of the present invention provides a robot system including a sensor for detecting a shape of an article being conveyed, a robot equipped with a gripping device capable of gripping a detected article, and a controller for controlling the robot. The controller includes: a gripping area setting unit that, for each one of detected articles, sets a gripping area in which the gripping device is to be positioned when the gripping device grips the article; a determination unit that determines presence or absence of interference between the gripping area that has been set and other articles; a storage unit that stores a result of determination on the presence or absence of interference determined by the determination unit in association with each detected article; a robot control unit that controls the robot to cause the gripping device to pick up an article for which no other article interferes with the gripping area thereof; and an updating unit that updates the result of determination stored in the storage unit every time an article is picked up by the gripping device.

In this aspect, upon detection of articles being conveyed by the sensor, a gripping area is set by the gripping area setting unit for each one of the detected articles. The presence or absence of interference between the gripping area that has been set and other articles is determined and the result of determination is stored in the storage unit. When no other article is present in the gripping area of one article and so there is no interference, the robot is controlled by the robot control unit so that the gripping device is positioned in the gripping area of the one article and the article is gripped by the gripping device. Thus, the article can be picked up without causing interference with other articles.

After the one article is picked up by the robot, the presence or absence of interference among articles is determined by the determination unit in the situation after the picking up, and the updating unit updates the results of determination stored in the storage unit based on the new result of determination. Thus, as a result of picking up the one article, interference with the one article in the gripping area of another article would be eliminated if the picked-up article interfered with the gripping area of the other article. Then, if no further article interferes with the gripping area of the other article, the other article, which was unpickable before the picking up of the one article, turns into an article that can be picked up by the gripping device after the one article is picked up. In this manner, even an article with whose gripping area multiple articles were interfering at the time of article detection turns into an article that can be picked up by the gripping device after the interfering articles are picked up.

In the aspect, the storage unit may store first interfering article information, the first interfering article information associating identification information of each one article with identification information of another article interfering with the gripping area set for that one article.

With this configuration, an article that is not associated with the identification information of any other article in the first interfering article information can be picked up by the gripping device. This enables the robot control unit to determine an article that can be picked up next by the gripping device by referencing only the first interfering article information and execute the picking up of the article.

In the aspect, the storage unit may store second interfering article information, the second interfering article information associating identification information of another article having a gripping area with which the one article interferes with the identification information of the one article.

With this configuration, when one article has been picked up by the gripping device, determination of an article that can be picked up next by the gripping device is facilitated by updating the first interfering article information corresponding to the identification information of other articles associated with the identification information of the one article in the second interfering article information.

In the aspect, when identification information of two articles are associated with each other in the first interfering article information, the two articles may be excluded from an update by the updating unit.

With this configuration, multiple articles that interfere with each other's gripping area are marked as unpickable articles in the first interfering article information, irrespective of updating of results of determination which is caused by picking up of another separate article by the gripping device. This eliminates the necessity to update the results of determination for an article and other articles that interfere with each other's gripping area even when another separate article is picked up.

In the aspect, the gripping area setting unit may set different gripping areas in accordance with a kind of an article detected by the sensor.

With this configuration, the gripping area is set in accordance with the shape or the like of an article, so that the gripping device can grip the article in a stable attitude.

Another aspect of the present invention provides a control method for a robot system, the method including: a detection step of detecting a shape of an article being conveyed; a gripping area setting step of setting, for each one of detected articles, a gripping area in which a gripping device is to be positioned when the gripping device is caused to grip the article; a determination step of determining presence or absence of interference between the gripping area that has been set and other articles; a storage step of storing a result of determination on the presence or absence of interference in a storage unit in association with each detected article; a control step of controlling a robot to cause the gripping device to pick up an article for which no other article interferes with the gripping area thereof; and an updating step of updating the result of determination stored in the storage unit every time an article is picked up by the gripping device.

In this aspect, the gripping area is set for each detected article and the result of determination on the presence or absence of interference between the gripping area that has been set and other articles is stored in the storage unit. When no other article interferes with the gripping area of an article, the gripping device under control can grip the gripping area of the article and pick it up without causing interference with other articles. After the article is picked up, the result of determination stored in the storage unit is updated. In this manner, even if other articles interfere with the gripping area of an article at the time of detection, the other articles may become pickable after updating of results of determination and picking up of articles are repeated.

The robot system and control method for the robot system according to the present invention have the effect of being able to pick up a target article even in a situation where multiple articles lie in close proximity to each other.

The invention claimed is:

1. A robot system comprising a sensor for detecting a shape of an article being conveyed, a robot equipped with a gripping device capable of gripping a detected article, and a controller for controlling the robot, the controller comprising;
    a gripping area setting unit that, for each one of detected articles, sets a gripping area in which the gripping device is to be positioned when the gripping device grips the article;
    a determination unit that initially determines a presence or absence of interference between the gripping area that has been set and other articles;
    a storage unit that stores a result of determination on the presence or absence of interference determined by the determination unit in association with each detected article;
    a robot control unit that controls the robot to cause the gripping device to pick up an article for which no other article interferes with the gripping area thereof; and
    an updating unit that updates the result of determination stored in the storage unit every time an article is picked up by the gripping device,
    wherein, after the updating unit updates the result of the determination stored in the storage unit, the determination unit again determines the presence or absence of interference between the gripping area that has been set and the other articles.

2. The robot system according to claim 1, wherein the gripping area setting unit sets different gripping areas in accordance with a kind of an article detected by the sensor.

3. The robot system according to claim 1, wherein the storage unit stores first interfering article information, the first interfering article information associating identification information of each one article with identification information of another article interfering with the gripping area set for the one article.

4. The robot system according to claim 3, wherein the storage unit stores second interfering article information, the second interfering article information associating identification information of another article having a gripping area with which the one article interferes with the identification information of the one article.

5. The robot system according to claim 3, wherein, when identification information of two articles are associated with each other in the first interfering article information, the two articles are excluded from an update by the updating unit.

6. A control method for a robot system, the method comprising:
- a detection step of detecting a shape of an article being conveyed;
- a gripping area setting step of setting, for each one of detected articles, a gripping area in which a gripping device is to be positioned when the gripping device is caused to grip the article;
- a determination step of initially determining a presence or absence of interference between the gripping area that has been set and other articles;
- a storage step of storing a result of determination on the presence or absence of interference in a storage unit in association with each detected article;
- a control step of controlling a robot to cause the gripping device to pick up an article for which no other article interferes with the gripping area thereof;
- an updating step of updating the result of determination stored in the storage unit every time an article is picked up by the gripping device; and
- after the updating step, another determination step of again determining the presence or absence of interference between the gripping area that has been set and the other articles.

* * * * *